United States Patent [19]

Neitzell

[11] Patent Number: 5,345,850
[45] Date of Patent: Sep. 13, 1994

[54] BELT TENSIONING DEVICE FOR BAND SAWS

[75] Inventor: Roger D. Neitzell, Park Ridge, Ill.

[73] Assignee: S-B Power Tool Company, Chicago, Ill.

[21] Appl. No.: 101,291

[22] Filed: Aug. 9, 1993

[51] Int. Cl.⁵ .............................................. B26D 1/48
[52] U.S. Cl. ........................................ 83/814; 83/788; 474/135
[58] Field of Search ................... 83/788, 814; 474/133, 474/134, 135

[56] References Cited

U.S. PATENT DOCUMENTS

| | | | |
|---|---|---|---|
| 1,186,982 | 6/1916 | Hall | 474/135 |
| 1,423,172 | 7/1922 | Anderson | 474/133 |
| 2,499,287 | 2/1950 | Wilson | 474/84 |
| 3,722,306 | 3/1973 | Campbell et al. | 474/903 X |

Primary Examiner—Richard K. Seidel
Assistant Examiner—Raymond D. Woods
Attorney, Agent, or Firm—Jones, Day, Reavis & Pogue

[57] ABSTRACT

A bandsaw assembly including an improved drive belt tensioning device which enables efficient manual engagement and disengagement from the drive belt through use of an overcenter bracket. The overcenter bracket includes a spring releasably holding the tensioning device out of engagement with the belt to permit the operator to use both hands during a belt changing operation.

2 Claims, 2 Drawing Sheets

BELT TENSIONING DEVICE FOR BAND SAWS

FIELD OF THE INVENTION

The present invention relates to band saws. More particularly, the present invention relates to a belt tensioning assembly for such band saws.

BACKGROUND OF THE INVENTION

Band saws are well-known in the art. Typically, such band saws include an endless band with a sawtooth formation along one edge thereof. The band is mounted for movement in a vertical plane by upper and lower spindles. Normally, the lower spindle is driven by a belt which in turn is driven from a powered drive shaft. The drive shaft and the shaft mounting the lower spindle are preferably provided with sprockets of different diameters to bring about plural speeds of operation, such as a high speed and a low speed. The speeds are selected by manually training the drive belt around selected sprockets on the drive shaft and the lower spindle.

A belt tensioning device is preferably provided to maintain the drive belt taut at all times and irrespective of the sprockets engaged by the drive belt. Prior art tensioning devices are awkward to work with as they must be held out of engagement with the belt during a belt changing operation as a different speed of the band saw is desired.

Generally speaking, belt tensioning devices of various forms are well known in the art. For example, U.S. Pat. Nos. 2,499,287 entitled, Power Transmission Mechanism; 3,057,218 entitled, Drive Assembly; 3,762,229 entitled, Variable Power Ratio Device; and 4,917,654 entitled, Belt Tensioning Arrangement, each disclose a means of providing automatic tensioning of a drive belt as it is stretched during use. The tensioning devices disclosed in the foregoing U.S. Pats., however, are designed to be always in engagement with the drive belt.

U.S. Pat. Nos. 1,423,172 entitled, Ratchet Clutch For Drive Mechanism, and 4,530,682 entitled, Tensioning Arrangement With a Damping Device For a Belt Drive, disclose means for disengaging belt tightening devices to enable the changing of the drive belt. In U.S. Pat. No. 1,423,172, a spring biased lever is used to engage and disengage the tensioning means from the drive belt. A spring biases the lever toward the disengaged position. Thus, the operator must apply continuous pressure to the lever to maintain engagement of the tensioner with the drive belt. In U.S. Pat. No. 4,530,682, the tensioner is disengaged by loosening a screw or bolt which maintains the tensioning device in a position to engage the drive belt.

The present invention overcomes the inefficiencies of the devices known and disclosed in the prior art. The present invention by use of an overcenter bias means facilitates quick and efficient engagement and disengagement of the tensioning device with the drive belt.

SUMMARY OF THE INVENTION

A band saw assembly including an improved drive belt tensioning device which enables efficient manual engagement of and disengagement from the drive belt through use of an overcenter means.

DESCRIPTION OF THE INVENTION

Figure 1:
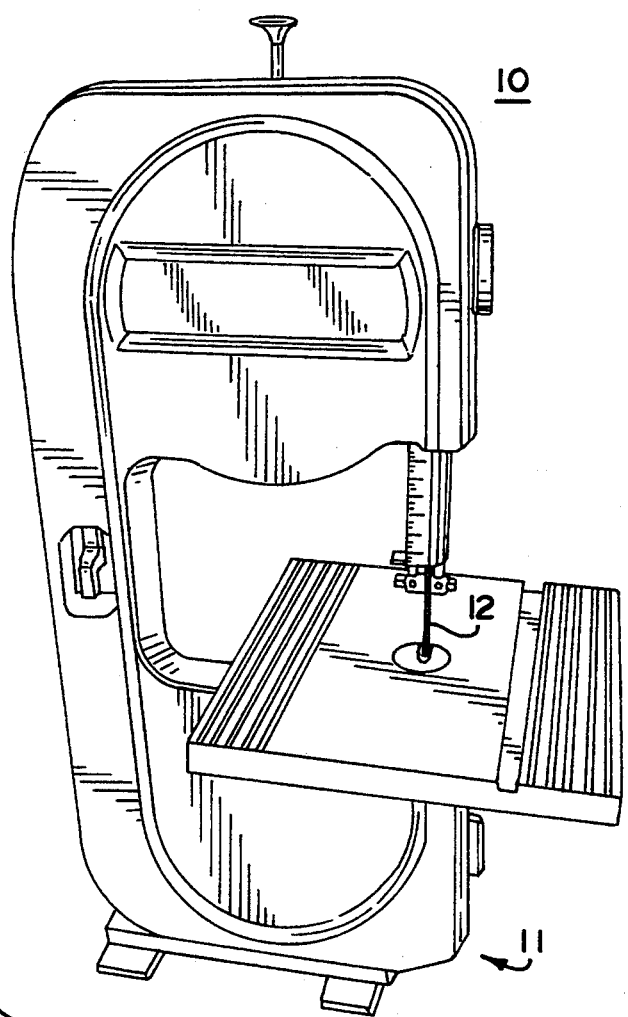
FIG. 1 is a perspective view of a band saw assembly according to the present invention.
Figure 2:
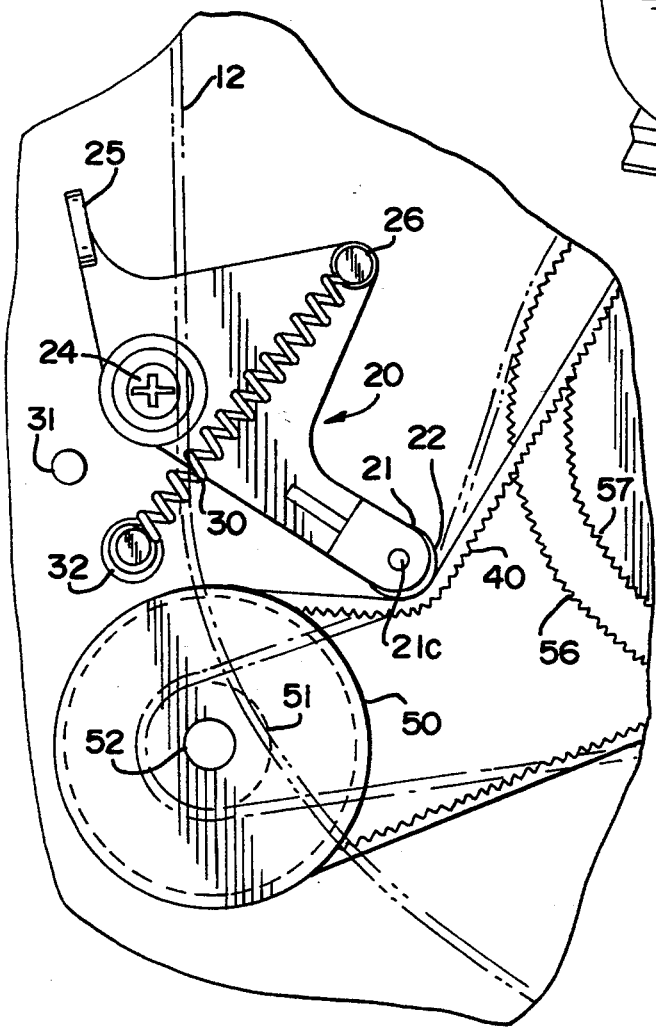
FIG. 2 is a side elevational view of the drive assembly with the belt tensioner shown engaged with the drive belt.
Figure 4:
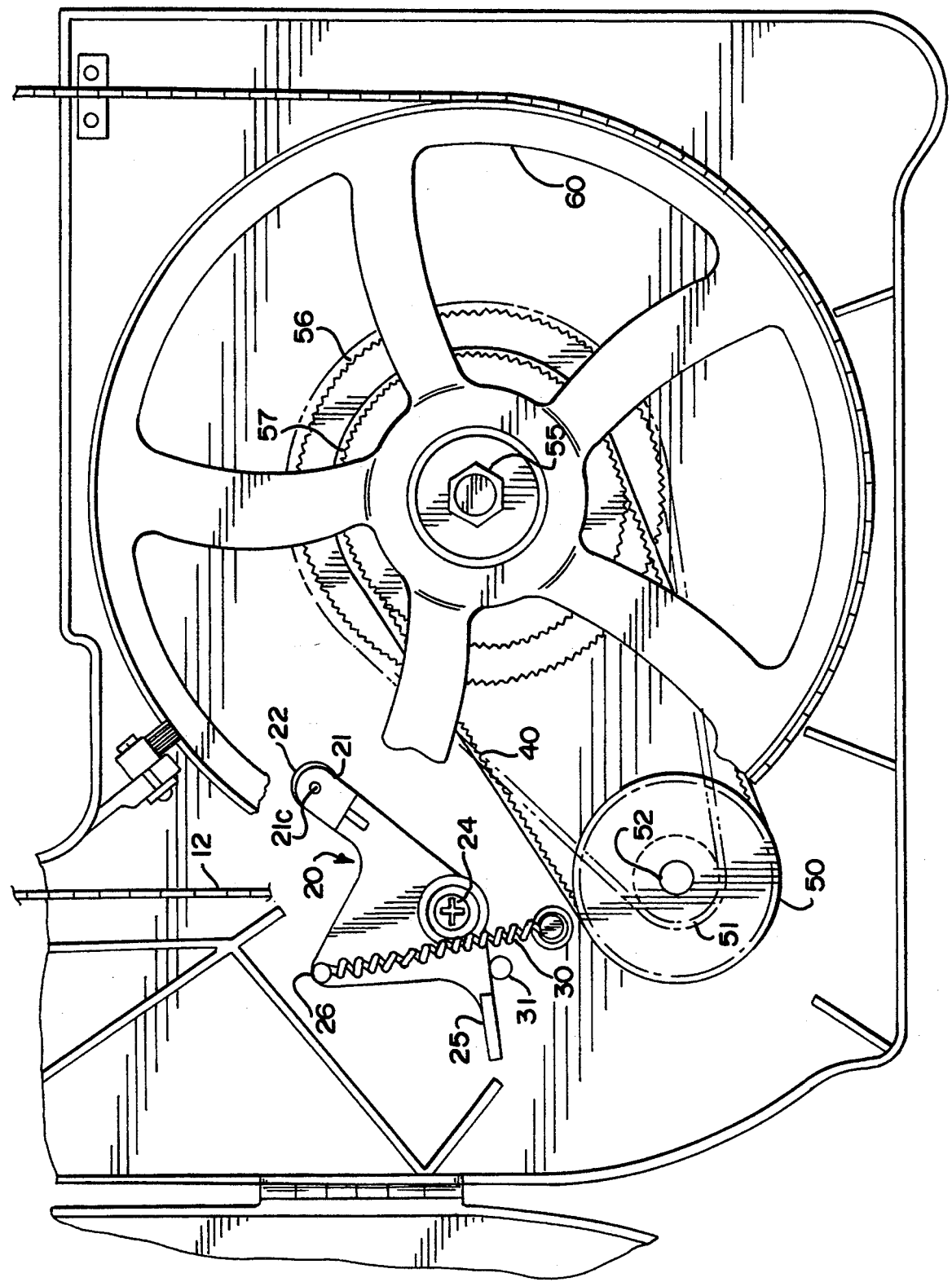
FIG. 4 is an elevational view similar to FIG. 2 showing the belt tensioner disengaged from the drive belt.

Referring more particularly to the drawings and as shown in FIG. 1, a band saw assembly utilizing the present invention is indicated by the reference 10. In general, the band saw assembly 10 includes a housing 11 and an endless saw band 12 capable of movement in a vertical plane. As best illustrated in FIGS. 2 and 4, the endless sawing blade 12 is supported on an upper spindle wheel (not shown) and a lower spindle wheel 60, the latter being rotatably mounted on a spindle shaft 55. The sawing blade is moved through the use of a driving sprocket 50 or 51 mounted on a drive shaft 52 which, in turn, is driven by a motor (not shown). The selected drive sprocket 50 or 51 drives a driven sprocket 56 or 57 each mounted on the driven spindle shaft 55. Thus, spindle 60 is rotated causing the endless sawing band 12 to move in a vertical plane.

Figure 3:
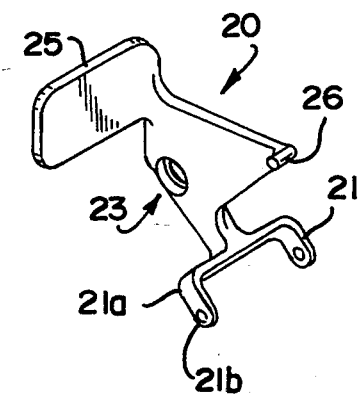
FIG. 3 is a perspective view of the body of the belt tensioner.

As best illustrated in FIGS. 2, 3 and 4, a bracket 20 is swingably connected to housing 11 by a fastener 24. Bracket 20 includes a U-shaped formation 21 having legs 21a, each provided with an aperture 21b for receiving a pin 21c mounting a roller 22. Bracket 20 includes an aperture 23 in which fastener 24 is received. The bracket also includes a finger tab 25 and a nob 26.

Roller 22 is maintained in engagement with or in disengagement from a drive belt 40 by means of a spring 30. One end of spring 30 is engaged with nob 26 while the other end of spring 30 is engaged with a protruding element 32, such as a pin, which is mounted on housing 11. The present invention also includes a stop pin 31 mounted on housing 11.

In operation, the motor of band saw assembly 10 is started causing rotation of drive shaft 52. Drive belt 40 is supported on one of either drive sprocket 50 or 51 and one of either driven sprocket 56 or 57 to attain the desired speed of movement of sawing band 12.

Roller 22 then is engaged with drive belt 40. This engagement of roller 22 with drive belt 40 is facilitated by manual use of finger tab 25 to rotate bracket 20 about fastener 24. As bracket 20 is rotated about fastener 24, spring 30 passes over the axis of rotation of bracket 20 thereby exerting a force tending to bias roller 22 into engagement with drive belt 40. Such engagement has the effect of exerting a tension force on drive belt 40 so as to maintain drive belt 40 in efficient contact with the selected driving sprocket 50 or 51 and the selected driven sprocket 56 or 57 during operation. The area of contact is made by roller 22 which bears against the outer surface of drive belt 40. Roller 22 should be of a suitable material and mounted in a manner suitable to minimize the frictional wear on drive belt 40.

FIG. 2 illustrates the belt tensioning device in its operable or engaged position for applying appropriate tension to the drive belt 40. It will be seen that the spring 30 is in an overcenter relationship with respect to the pivot axis defined by the fastener 24. Thus, the spring 30 will serve to urge the roller 22 into engagement with the outside surface of the belt 40. Appropriate tensioning will be provided irrespective of the driving and driven sprockets selected.

FIG. 4 shows the belt tensioning bracket in its inoperative or disengaged position. Again, it will be seen that the spring 30 establishes an overcenter relationship with the pivot axis defined by the fastener 24. The roller 22 is releasably held in the inoperative position by reason of abutting engagement with the stop pin 30. Since the roller 22 is releasably held in spaced relationship with the drive belt 40, the operator may readily have access to the drive belt and may use both of his hands for training the belt around the desired sprockets to achieve the speed of the band selected by the operator.

Although a preferred form of the invention has been disclosed and described herein, it is apparent to those skilled in the art that various modifications may be made without departing from the spirit and scope of the invention as set forth in the appended claims.

I claim:

1. A band saw assembly comprising:

a housing;

an upper and a lower spindle wheel each rotatably mounted on said housing and supporting an endless sawing band for movement about said spindle wheels in a vertical plane;

a driving shaft mounting at least one driving sprocket gear;

a driven shaft mounting one of said spindle wheels, said driven shaft mounting at least one driven sprocket gear;

at least one of said driving and driven shafts mounting plural ones of said sprocket gears of different diameters;

a drive belt engaged with selected ones of said driving and driven sprocket gears;

a bracket assembly pivotally mounted on the housing adjacent stop means and including a belt tensioning roller, said bracket assembly further including an overcenter biasing means connected to said bracket assembly and to said housing, thereby alternately and selectively maintaining said roller (a) in engagement with said drive belt so as to impart and maintain a tension in the drive belt and (b) in engagement with said stop means and in spaced relationship with the drive belt so as to facilitate training of the belt over selected ones of said sprocket gears.

2. A band saw assembly according to claim 1, wherein said bracket assembly further includes a tab for manual engagement and disengagement of said roller with said belt.

* * * * *